United States Patent
Oozeki

(10) Patent No.: US 8,036,708 B2
(45) Date of Patent: Oct. 11, 2011

(54) MOBILE COMMUNICATION TERMINAL AND MOBILE COMMUNICATION METHOD

(75) Inventor: Keisuke Oozeki, Tokyo (JP)

(73) Assignee: NEC Corporation, Tokyo (JP)

( * ) Notice: Subject to any disclaimer, the term of this patent is extended or adjusted under 35 U.S.C. 154(b) by 764 days.

(21) Appl. No.: 12/065,802

(22) PCT Filed: Sep. 1, 2006

(86) PCT No.: PCT/JP2006/317349
§ 371 (c)(1),
(2), (4) Date: Mar. 5, 2008

(87) PCT Pub. No.: WO2007/029617
PCT Pub. Date: Mar. 15, 2007

(65) Prior Publication Data
US 2009/0163245 A1   Jun. 25, 2009

(30) Foreign Application Priority Data
Sep. 8, 2005   (JP) .................... 2005-260543

(51) Int. Cl.
*H04B 1/38* (2006.01)
(52) U.S. Cl. ............. 455/558; 455/517; 455/412.1; 455/410; 455/411; 340/568.1; 340/568.7; 235/380; 235/439; 235/475
(58) Field of Classification Search .............. 455/557, 455/558, 550.1, 517, 412.1, 410, 411; 340/568.1, 340/568.7; 235/380, 439, 475–481
See application file for complete search history.

(56) References Cited

U.S. PATENT DOCUMENTS

| | | | |
|---|---|---|---|
| 5,778,321 A * | 7/1998 | Jouin et al. | 455/558 |
| 6,263,214 B1 * | 7/2001 | Yazaki et al. | 455/558 |
| 6,763,249 B2 * | 7/2004 | Shirai | 455/558 |
| 7,454,231 B2 * | 11/2008 | Sato | 455/558 |
| 7,526,318 B2 * | 4/2009 | Asada | 455/558 |
| 7,725,131 B2 * | 5/2010 | Wood et al. | 455/558 |
| 2002/0120857 A1 * | 8/2002 | Krishnan et al. | 713/193 |
| 2004/0166839 A1 * | 8/2004 | Okkonen et al. | 455/419 |
| 2004/0204092 A1 * | 10/2004 | Sato | 455/558 |
| 2005/0192054 A1 * | 9/2005 | Asada | 455/558 |

FOREIGN PATENT DOCUMENTS

| | | |
|---|---|---|
| JP | 11191804 A | 7/1999 |
| JP | 11191805 A | 7/1999 |
| JP | 11313148 A | 11/1999 |
| JP | 2001309433 A | 11/2001 |
| JP | 2002319892 A | 10/2002 |
| WO | 02069657 A1 | 9/2002 |

OTHER PUBLICATIONS

International Search Report for PCT Application No. PCT/JP2006/317349, mailed Oct. 3, 2006.

* cited by examiner

*Primary Examiner* — Edward Urban
*Assistant Examiner* — Rui Hu

(57) ABSTRACT

There is provided a mobile communication terminal in which at occurrence of instantaneous disconnection in the contact of a card, the disconnection is restored without displaying the alarm by use of a simple configuration and unpleasantness is not imposed to the user.

The terminal includes an interruption detection module 110 to detect an inserted state of a card and an SIM communication controller 111 to determine presence or absence of removal or replacement of the card in response to detection by the interruption detection module 110; the controller 111 makes the terminal continue a normal operation if it is determined that neither the removal nor the replacement is present.

7 Claims, 3 Drawing Sheets

MOBILE COMMUNICATION TERMINAL AND MOBILE COMMUNICATION METHOD

TECHNICAL FIELD

The present invention relates to a mobile communication terminal and a mobile communication method in which radio communication is conducted by use of an Integrated Circuit (IC) card storing subscriber identifying information.

RELATED ART

In a mobile communication terminal using a radio communication method such as a Global System for Mobile Communications or a Universal Mobile Telecommunications System, an IC card called Subscriber Identify Module (SIM) card is employed as means to input subscriber identifying information. The SIM card stores, as the subscriber identifying information, an Internal mobile Subscriber Identify (IMSI), an identification number or the like. The mobile communication terminal includes a card connector. By use of the connector, the SIM card is attachable to and detachable from the terminal. The terminal conducts communication on the basis of the subscriber identifying information read from the SIM card mounted thereon.

In a mobile communication terminal using an SIM card as above, there exists a case of occurrence of instantaneous disconnection of contact between the card connector and the SIM card, namely, instantaneous disconnection; in this situation, a communication error occurs between the SIM card and the mobile communication terminal. At occurrence of a communication error, the terminal displays an alarm of the communication error in an ordinary case; however, this leads to a problem of unpleasantness to the user since the user has neither removed the SIM card, nor has replaced the SIM card in this case.

For example, patent article 1 has disclosed a mobile communication terminal which allows the user to safely attach a card thereto and to safely detach the card therefrom. This terminal includes a main power source, an interface module capable of replacing a storage medium, a storage medium detecting unit which detects an event of connection of a storage medium, a storage medium identifying unit which identifies whether the detected storage medium is a storage medium having recorded subscriber identifying information, and a control module for controlling the storage medium detecting unit and the storage medium identifying unit; the terminal operates as below. That is, in a case wherein the storage medium detecting unit detects an event that a storage medium has been detected and the storage medium is a storage medium having recorded subscriber identifying information, the control module automatically executes connection processing for connection to a network; when the connection is to be released, the control module automatically executes disconnection processing for disconnection from the network before the release of the connection. During the connection processing for connection to a network and the disconnection processing from the network, the condition is notified.

Also, a mobile communication terminal disclosed by patent article 2 includes an IC card having stored an identification number, a mobile communication terminal main body communicable in a state in which the IC card is installed therein, and a power source module for supplying power to the mobile communication terminal main body; the terminal operates as follows. That is, when the supply of power from the power source module is temporarily interrupted, the identification number beforehand obtained from the IC card is compared with the identification number stored in the IC card after the supply of power is restarted; if the identification numbers match each other, the mobile communication terminal main body is changed to a communicable state. As a result, when the power supply to the main body is temporarily interrupted, the user confirmation operation including a key-in operation can be dispensed with.

Patent article 1: Japanese Patent Laid-Open Pub. No. 2002-319892

Patent article 2; Japanese Patent Laid-Open Pub. No. 2001-309433

DISCLOSURE OF THE INVENTION

Problem to be Solved by the Invention

In the mobile communication terminal disclosed by patent article 1 described above, the connection processing for connection to a network and the disconnection processing from the network can be safely carried out via the storage medium; however, description has not been given of operation to cope with a case in which instantaneous disconnection occurs in the contact with the storage medium.

Moreover, in the mobile communication terminal disclosed by patent article 2 described above, there exist problems: although it is possible to cope with the instantaneous interruption of supply of power such as a case of disconnection of a battery pack, a case in which instantaneous interruption occurs in the contact with the IC card cannot be coped with; furthermore, since the collation is accomplished by use of the identification number stored in the IC card, it is required to encrypt the identification number read from the IC card, and hence the mobile communication terminal is complex in its configuration and the processing time is elongated.

It is therefore an exemplary object of the present invention, which has been devised to solve the problem above, to provide a mobile communication terminal and a mobile communication method in which at occurrence of the instantaneous disconnection of the card, the disconnection is restored without displaying the alarm by use of a simple configuration and unpleasantness is not imposed to the user.

Means for Solving the Problems

A mobile communication terminal in accordance with a configuration of the present invention is characterized by including a detecting unit that detects an inserted state of a card, a judge unit that determines presence or absence of removal or replacement of the card in response to detection by the detecting unit, and control unit that makes the terminal continue a normal operation if the judge unit determines that neither the removal nor the replacement is present.

Specifically, the detecting unit is capable of detecting interruption between the card and the mobile communication terminal. Moreover, the terminal includes a communication error detecting unit that detects a communication error between the card and the mobile communication terminal.

Additionally, the judge unit can determine presence or absence of removal of the card on the basis of presence or absence of a response signal from the card. Also, if a response signal from the card is absent, the judge unit can repeatedly conduct an operation, in which power to the card is turned off, power is turned on again, reset processing is executed, and then presence or absence of the response signal is confirmed again, for a fixed period of time until the response signal is present.

In addition, if it is determined that the card removal is absent, the judge unit can read subscriber information from the card, collate the subscriber information with subscriber information which is read from a card and stored in a storage at activation of the mobile communication terminal, and determine that the card replacement is present if both information do not match each other. Furthermore, the mobile communication terminal further includes a display unit, and if it is determined that the card removal or replacement is present, the judge unit can display an alarm on the display unit.

A mobile communication method in accordance with a configuration of the present invention is characterized by including detecting an inserted state of a card, determining presence or absence of removal or replacement of the card in response to the detection, and continuing a normal operation if it is determined that neither the removal nor the replacement is present. Specifically, it is possible that presence or absence of removal of a card can be determined on the basis of presence or absence of a response signal from the card. Additionally, if it is determined that the card removal is absent, it is possible that subscriber information is read from the card, the subscriber information is collated with subscriber information which is read from a card and stored in a storage at activation of a mobile communication terminal, and it is determined that the card replacement is present if both information do not match each other.

ADVANTAGE OF THE INVENTION

In accordance with the present invention, in response to detection of an inserted state of the card, the judge unit determines presence or absence of removal or replacement of the card; in a case other than the removal and the replacement, instantaneous disconnection of the card contact is determined and control unit makes the terminal continue normal operation; there can be hence obtained an advantage in which the instantaneous disconnection of the card is restored without displaying the alarm by using a simple configuration and unpleasantness is not imposed to the user.

BEST MODE FOR CARRYING OUT THE INVENTION

First Exemplary Embodiment

Next, description will be given of an exemplary embodiment of the present invention by referring to drawings. FIG. 1 is a block diagram showing a configuration of a mobile communication terminal in accordance with the present invention. As shown in the block diagram, the mobile communication terminal 100 includes a radio module 101, a baseband module 102, a control module 103, a display and operation module 104, a storage module 105, and an SIM card connector 106.

The radio module 101 modulates under supervision of the control module 103 a signal inputted from the baseband module 102 to transmit the signal to a radio base station, and demodulates a signal sent from the radio base station to output the signal to the baseband module 102. The baseband module 102 executes baseband processing and data processing for data designated by the control module 103 to output the data to the radio module 101. Additionally, the baseband module 102 executes data processing and baseband processing for data received from the radio module 101. The control module 103 controls the radio module 101, the baseband module 102, and the display and operation module 104, and communicates via the SIM card connector 106 with an SIM card inserted by the user.

The display and operation module 104 displays data to the user under control of the control module 103 and outputs to the control module 103 the contents of operation conducted by the user. The storage module 105 keeps therein a program to control operation of the mobile communication terminal 100 or data inputted from the user, and the like. The SIM card connector 106 receives an SIM card inserted by the user to read data therefrom.

FIG. 2 is a block diagram showing a specific structure of the control module 103 and the SIM card connector 106. As the block diagram shows, the control module 103 includes an interruption detecting module (detecting unit) 110, an SIM communication control module (judge unit, control unit) 111, and a communication error detecting module (communication error detecting unit) 114. The SIM card connector 106 includes an SIM inserted state detecting mechanism (detecting unit) 112 and an SIM terminal contact module 113.

The interruption detecting module 110 detects interruption in the radio communication terminal 100 from an external device on the basis of an SIM inserted state detection signal 210 from the SIM inserted state detecting mechanism 112. The SIM communication control module 111 communicates with the SIM card by using communication signals for the general SIM card such as Supply to voltage (VCC) 202, Reset signal (RST) 203, Clock Signal (CLK) 204, Ground (GND) 205, and Data input output (I/O) 206. VCC 202 is a signal to supply power, RST 203 is a signal to reset the SIM card, CLK 204 is a clock signal, GND 205 is a signal indicating a reference voltage of 0 (V), and I/O 206 is a signal to input/output data. The communication error detecting module 114 will be described in conjunction with a second exemplary embodiment which will be described later.

The SIM inserted state detecting mechanism 112 is a switch to detect by mechanical means an inserted state of the SIM card. By use of the SIM inserted state detection signal 210, the inserted state of the SIM card is notified to the interruption detecting module 110. The SIM terminal contact module 113 is a mechanism with which a terminal of the SIM card inserted by the user is brought into contact; when the SIM card terminal is brought into contact with the contact module 113, communication is carried out between the SIM card and the SIM communication control module 111 via the respective signals, i.e., VCC 202, RST 203, CLK 204, GND 205, and I/O 206.

FIG. 3 is a flowchart to explain an operation of the mobile communication terminal 100 and the control module 103. Referring to FIGS. 2 and 3, description will be given of the operation of the control module 103.

At activation of the terminal 100, if an SIM card has been inserted in the connector 106, the SIM inserted state detecting mechanism 112 detects the state to deliver an SIM inserted state detection signal 210 to the interruption detection module 110. The module 110 detects the SIM card insertion according to the signal 210 and then notifies the condition to the SIM communication control module 111.

The control module 111 executes, in response to the notification, an SIM card activation sequence by use of the communication signals of the general SIM card, i.e., VCC 202, RST 203, CLK 204, GND 205, and I/O 206. Also, during the execution of the activation sequence, the control module 111 reads subscriber information from the SIM card to store the information in the storage module 105. Thereafter, the mobile communication terminal 100 starts its normal operation.

Assume here that removal or replacement of the SIM card or instantaneous disconnection of the contact between the SIM card and the connector 106 has taken place during the normal operation of the terminal. The SIM inserted state detecting mechanism 112 detects the change in the inserted state of the SIM card and supplies a detection signal 210 to the interruption detection module 110. According to the signal 210, the module 110 detects occurrence of the interruption (step ST301). The module 110 notifies the occurrence of interruption to the SIM communication control module 111. In response to the notification, the control module 111 turns VCC 202 off and interrupts power to the SIM card (step ST302). Subsequently, the module 111 turns VCC 202 and RST 203 on, supplies power to the SIM card, and supplies a reset signal thereto (step ST303).

After turning RST 203 on, the control module 111 waits for a reply (Answer To Reset (ATR)) of RST 203 from the SIM card (step ST304). In this situation, if the response of RST 203 is not received for a fixed period of time, the module 111 assumes that the SIM card has been removed from the connector 106; on the other hand, if the response is received, it can be considered that the SIM card has been replaced or instantaneous disconnection of the contact has occurred between the SIM card and the connector 106. If the response is absent in step ST304, the control module 111 increments, to again wait for a response of RST 203, a counter value N (step ST305), interrupts again power to the SIM card (step ST302), turns power on and turns RST on (step ST303), and then again waits for a response of RST. The response wait processing is repeatedly executed until the counter value N exceeds a fixed value M.

If the counter value N exceeds the fixed value M, the controller 111 assumes that the card has been removed and drives the display and operation module 104 to display an alarm of SIM card not inserted (step ST306).

On the other hand, if the response of RST from the SIM card is present in step ST304, the controller 111 reactivates the SIM card by executing the activation sequence thereof by use of VCC 202, RST 203, CLK 204, GND 205, and I/O 206 (step ST307). Next, to make a check to determine whether or not the SIM card for which the reactivation has been conducted matches the SIM card before the interruption detection in step ST301, the controller 111 conducts collation between the SIM cards (step ST308). The SIM card collation methods include a method of collating the subscriber information which the controller 111 has stored in the storage module 105 at activation of the terminal 100 with that read from the reactivated SIM card. As the subscriber information, there may be employed, for example, a subscriber number.

If the subscriber information read from the reactivated SIM card does not match that stored in the storage module 105 according to the collation, that is, if the reactivated SIM card is different from the SIM card before the interruption detection, the SIM communication control module 111 assumes that the replacement of the SIM card has occurred and makes the display and operation module 104 display the condition (step ST309). On the other hand, if the reactivated SIM card matches the SIM card before the interruption detection, the module 111 assumes that the instantaneous disconnection has occurred in the contact between the SIM card and the connector 106 and continues the normal operation (step ST310). That is, the module 111 resumes the operation state before the detection of SIM card interruption without displaying the error alarm.

As above, in accordance with the first exemplary embodiment, the interruption detecting module 110 detects the inserted state of the SIM card by using the SIM inserted state detection signal 210, the SIM communication controller 111 determines presence or absence of the removal or replacement of the SIM card by determining presence or absence of the ATR signal of the SIM card and conducting the SIM card collation; and if neither the removal nor the replacement has occurred, the normal operation is continuously conducted; therefore, at occurrence of instantaneous disconnection of the SIM card, it is possible to continue the normal operation without notifying an alarm to the user, and hence there is obtained an advantage that the restoration can be conducted without imposing unpleasantness to the user.

Second Exemplary Embodiment

In conjunction with the first exemplary embodiment, description has been given of a case in which interruption occurs in the contact of the SIM card; in conjunction with the second exemplary embodiment, description will be given of other interruption. For example, there exists a case wherein if noise temporarily appears in a communication signal between an SIM card and a mobile communication terminal due to static electricity or the like, a communication abnormality occurs between the SIM card and the terminal. For the second exemplary embodiment, description will be given of restoration at occurrence of such communication abnormality. The mobile communication terminal is similarly configured as shown in FIGS. 1 and 2 described in conjunction with the first exemplary embodiment, and FIG. 4 shows an operation of the control module 103.

In FIG. 4, if noise temporarily appears in the communication signal due to static electricity or the like during communication of the mobile communication terminal 100, the communication error detection module 114 detects the condition. For the noise detection, there may be used a general method of detecting noise. For example, there exists a method in which logical digital data of an I/O signal is compared with an I/O signal from the SIM card such that if an error is detected, it is assumed that noise has appeared. However, there may be employed other general SIM communication error detection methods, but description of details thereof will be avoided here. If the communication error detection module 114 detects noise (step ST401), the module 114 notifies the condition to the SIM communication controller 111. The controller 111 turns VCC 202 off to interrupt power to the SIM card (step ST402). Next, the controller 111 turns VCC 202 and RST 203 on, powers the SIM card, and inputs a reset signal for the SIM card (step ST403).

Thereafter, like in the first exemplary embodiment, the controller 111 waits for a response of RST 203 from the SIM card (step ST404); if the response is absent, the controller 111 increments the counter value N (step ST405), interrupts again power to the SIM card (step ST402), turns power on, and turns RST on (step ST403), and then waits again for a response of this RST. The response wait processing is repeatedly executed until the counter value N exceeds a fixed value M. If the counter value N exceeds the fixed value M, the controller 111 assumes that the card has been removed and drives the display and operation module 104 to display an alarm of SIM card re-insertion (step ST406).

On the other hand, if the response of RST from the SIM card is present, the controller 111 reactivates the SIM card by executing the activation sequence thereof by use of VCC 202, RST 203, CLK 204, GND 205, and I/O 206 (step ST407); to determine whether or not the reactivated SIM card matches the SIM card before the communication error detection, the controller 111 conducts collation between the SIM cards (step ST408).

According to the collation, if the reactivated SIM card does not match the SIM card before the communication error detection, the controller 111 assumes that the replacement of the SIM card has occurred and makes the display and operation module 104 display an alarm (step ST409). On the other hand, if the reactivated SIM card matches the SIM card before the communication error detection, the controller 111 resumes the normal state before the communication error detection (step ST410).

Incidentally, the communication error detection module 114 conducts an operation similar to that described above also at detection of noise influenced by an external factor, other than noise due to static electricity described above, such as a high-frequency wave in the peripheral environment.

As above, in accordance with the second exemplary embodiment, when the communication error detection module 114 detects a communication error, a check is made to determine presence or absence of the SIM card removal or replacement; if neither the removal nor the replacement has occurred, the normal operation is continuously conducted; therefore, at occurrence of a communication error due to static electricity or the like, it is possible to continue the normal operation without notifying an alarm to the user, and hence there is obtained an advantage that the restoration can be conducted without imposing unpleasantness to the user.

DESCRIPTION OF REFERENCE NUMERALS

Figure 1:
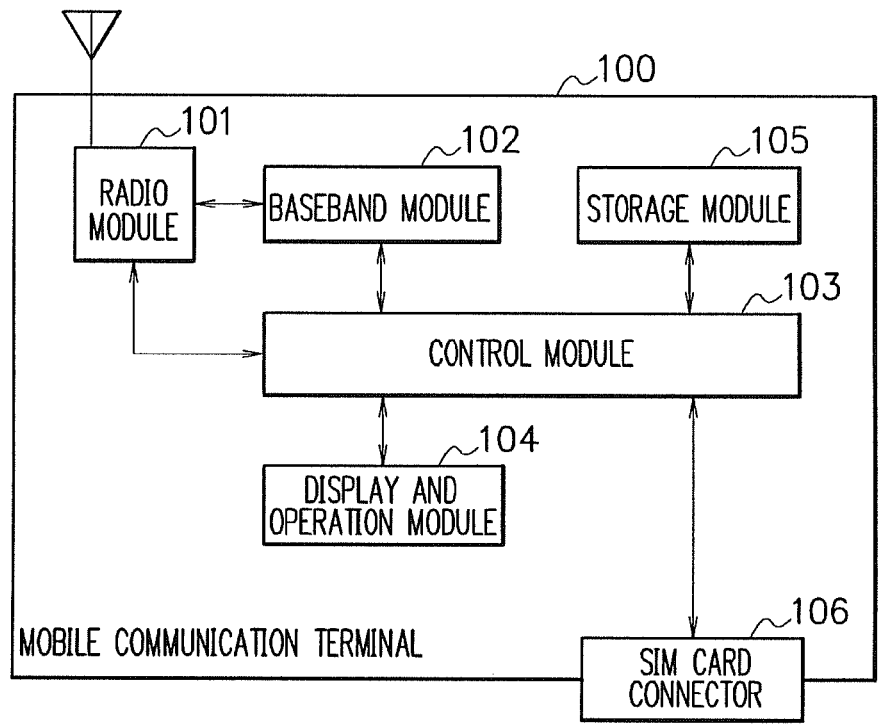
FIG. 1 is a block diagram showing structure of a mobile communication terminal in accordance with the present invention.
Figure 2:
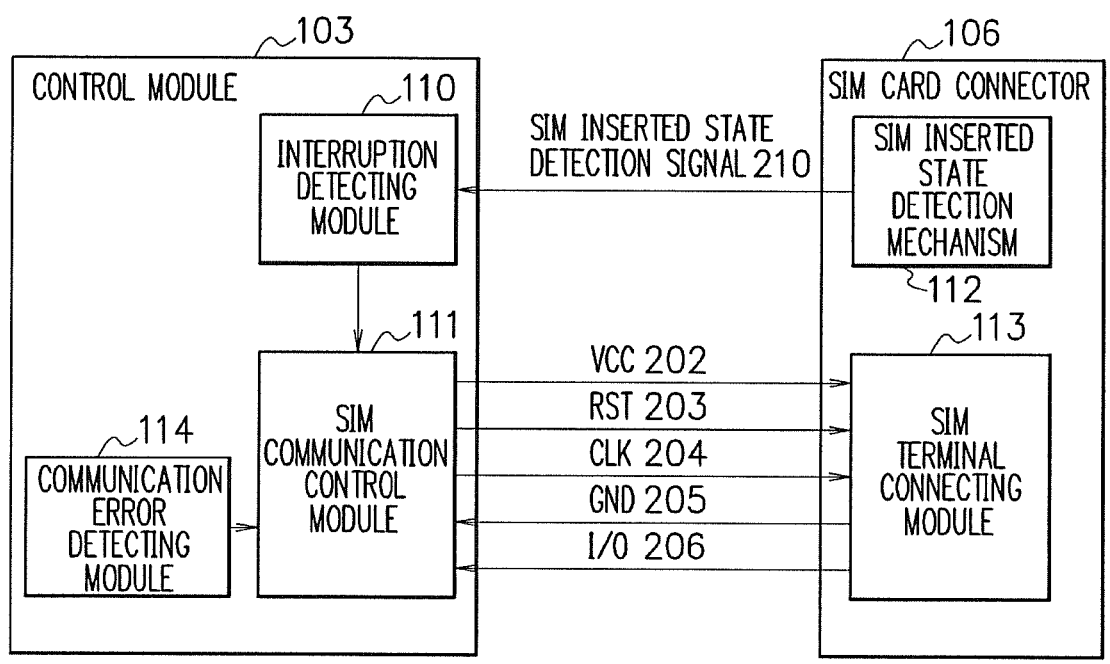
FIG. 2 is a block diagram showing a specific configuration of a control module and an SIM card connector.
Figure 3:
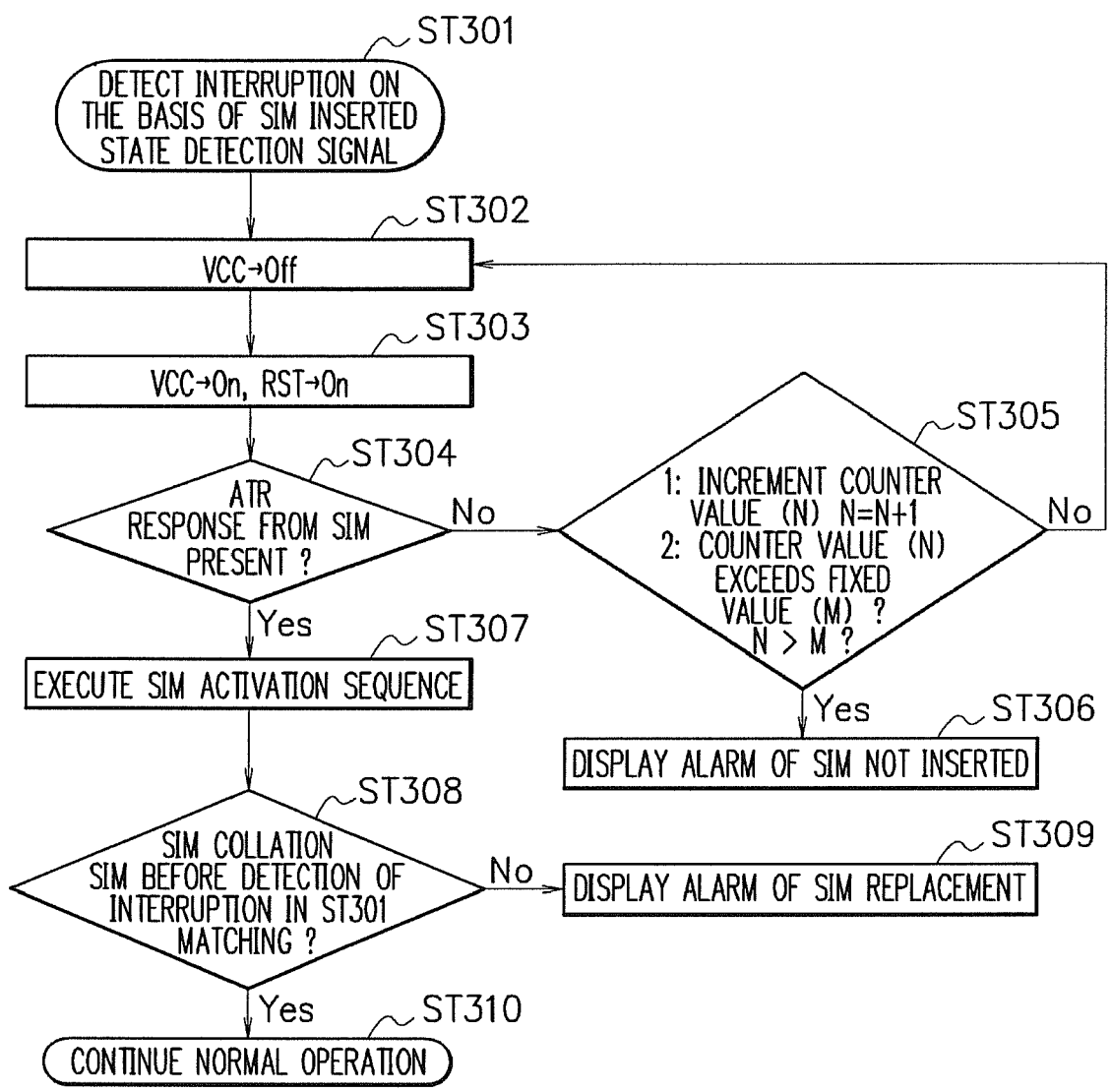
FIG. 3 is a flowchart to explain operation of a control module of a mobile communication terminal in accordance with a first exemplary embodiment.
Figure 4:
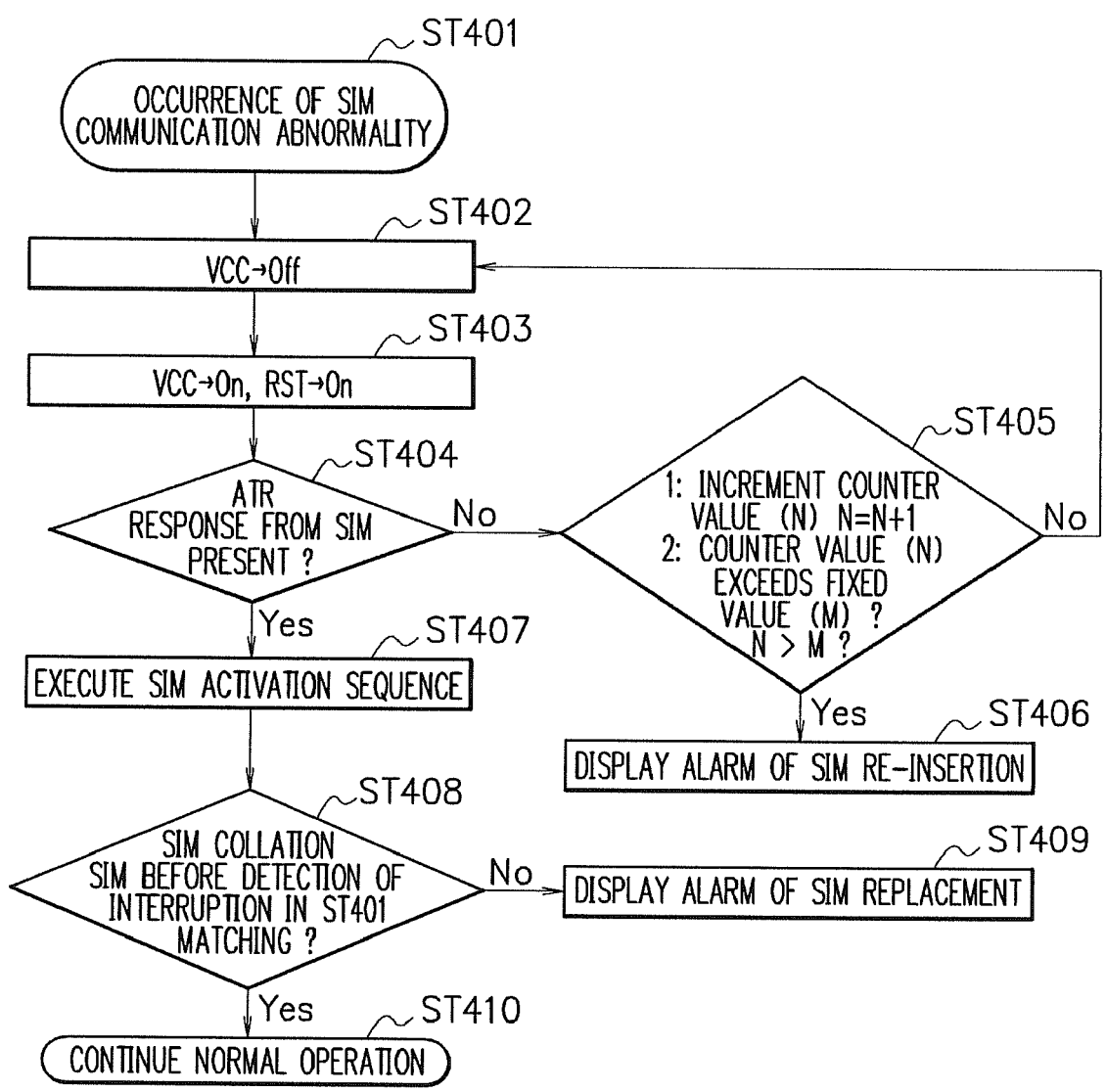
FIG. 4 is a flowchart to explain other operation of the control module of the mobile communication terminal in accordance with a second exemplary embodiment.

100 Mobile communication terminal
101 Radio module
102 Baseband module
103 Control module
104 Display and operation module
105 Storage module
106 SIM card connector
110 Interruption detection module
111 SIM communication control module
112 SIM inserted state detection mechanism
113 SIM terminal contact module
114 Communication error detection module
202 VCC
203 RST
204 CLK
205 GND
206 I/O
210 SIM inserted state detection signal

What is claimed:

1. A mobile communication terminal, comprising:
a detecting means for detecting an inserted state of a card;
a judge means for determining presence or absence of removal or replacement of the card in response to detection by the detecting means; and
a control means for making the terminal continue a normal operation if the judge means determines that neither the removal nor the replacement is present,
wherein the judge means:
determines presence or absence of removal of the card on the basis of presence or absence of a response signal from the card,
repeatedly conducts an operation, in which power to the card is turned off, power is turned on again, reset processing is executed, and then presence or absence of the response signal is confirmed again, for a fixed period of time until the response signal is present, when a response signal from the card is absent, and
determines that the removal of the card is present when the fixed period of time is passed over without the response signal from the card.

2. The mobile communication terminal in accordance with claim 1, characterized in that the detecting means detects interruption between the card and the mobile communication terminal.

3. The mobile communication terminal in accordance with claim 1, characterized by further comprising a communication error detecting means for detecting a communication error between the card and the mobile communication terminal, wherein the judge means determines presence or absence of removal or replacement of the card in response to detection of a communication error by the communication error detecting means.

4. The mobile communication terminal in accordance with claim 1, characterized in that if it is determined that the card removal is absent, the judge means reads subscriber information from the card, collates the subscriber information with subscriber information which is read from a card and stored in a storage at activation of the mobile communication terminal, and determines that the card replacement is present if both information do not match each other.

5. The mobile communication terminal in accordance with claim 4, characterized by further comprising a display means, wherein if it is determined that the card removal or replacement is present, the judge means displays an alarm on the display means.

6. A mobile communication method, comprising:
detecting an inserted state of a card,
determining presence or absence of removal or replacement of the card based on presence or absence of a response signal from the card,
conducting an operation, repeatedly, in which power to the card is turned off, power is turned on again, reset processing is executed, and then presence or absence of the response signal is confirmed again, for a fixed period of time until the response signal is present, when a response signal from the card is absent,
determining that the removal of the card is present when the fixed period of time is passed over without the response signal from the card, and
continuing a normal operation if it is determined that neither the removal nor the replacement is present.

7. The mobile communication method in accordance with claim 6, characterized by reading, if it is determined that the card removal is absent, subscriber information is read from the card, collating the subscriber information is collated with subscriber information which is read from a card and stored in a storage at activation of a mobile communication terminal, and determining that the card replacement is present if both information do not match each other.

* * * * *